Patented Aug. 9, 1938

2,126,284

UNITED STATES PATENT OFFICE 2,126,284

CATALYST

James R. Rose, Edgeworth, Pa., assignor of three-fourths to Michael L. Benedum and Joseph C. Trees, Pittsburgh, Pa.

No Drawing. Original application February 3, 1937, Serial No. 123,855. Divided and this application July 31, 1937, Serial No. 156,753

1 Claim. (Cl. 23—233)

This invention relates to a catalyst; and while the catalyst described and claimed herein is capable of use in other industries, it has been found to be particularly advantageous in the treatment of the dry gases from stabilizing towers for converting both the saturates and the unsaturates of said gases into liquid hydrocarbons. The catalyst described herein has given extremely satisfactory results in the treatment of gases of the character referred to and for the production of gasoline therefrom as set forth in my application Serial No. 123,855, filed February 3, 1937, of which this application is a division.

My aforesaid catalyst comprises a mixture of carnotite with barium fluoride, both ingredients being preferably in a finely divided condition. Where the gases to be treated have a relatively low olefin or paraffin content, the barium fluoride is mixed with the carnotite in the proportion of from 1 to 12 ounces of barium fluoride to each pound of carnotite used. In actual practice, a small amount of carnotite is introduced into the catalyzing chamber or chambers and the barium fluoride is sprinkled on top of the carnotite, in about the proportions mentioned. From time to time, successive charges of carnotite and barium fluoride are added to the chamber or chambers in the manner and in the proportions described for the first charge.

As pointed out in my application No. 123,855, referred to hereinbefore, the gases which are subjected to the action of my catalyst are heated to a temperature varying preferably between 500° F. and approximately 1000° F. and are maintained under pressures of from 200 to 1200 pounds per square inch. Within the temperature and pressure ranges mentioned, my catalyst has proved to be extremely efficient in the treatment of the gases subjected thereto. It is believed that this efficiency is due to the fact that the carnotite is radioactive, whereby it tends to crack the paraffins and olefins contained in the said gases; while, by the addition of the barium fluoride, the reaction initiated by the carnotite is greatly accelerated, with the result that a high yield of gasoline or of like liquid hydrocarbon fluid has been obtained. Furthermore, under the temperature and pressure conditions noted, the catalyst herein is practically indestructible and will last from five to ten times as long, without reactivation, as will the ordinary catalysts which have been used in this art. This is due to the fact that the radioactivity of the carnotite is not affected by the higher temperatures to which it may be subjected. Where other catalysts of the prior art, with which I am familiar, are employed, it is necessary to reactivate the same from time to time. This involves the shutting down of the furnaces in which they are employed and/or the renewal of the catalyst employed therein.

Having thus described my invention, what I claim is:

A catalyst suitable for the treatment of refinery gases containing saturates and unsaturates under temperatures of from 500 to 1000 degrees F. and pressures of from 200 to 1200 pounds per square inch, the said catalyst comprising a mixture of the following ingredients in the following proportions by weight:

16 parts by weight of carnotite
1 to 12 parts by weight of barium fluoride.

JAMES R. ROSE.